United States Patent [19]

Ferguson

[11] Patent Number: 5,825,986
[45] Date of Patent: Oct. 20, 1998

[54] METHOD FOR DETERMINING INK REQUIREMENTS

[75] Inventor: Gary J. Ferguson, Mountain View, Calif.

[73] Assignee: CKS Partners, Cupertino, Calif.

[21] Appl. No.: 669,751

[22] Filed: Jun. 26, 1996

[51] Int. Cl.$^6$ .............................. H04N 1/21; H04N 1/46; B41B 15/00; B41J 15/00

[52] U.S. Cl. .......................... 395/109; 395/101; 358/296; 358/501; 358/538

[58] Field of Search ..................................... 395/102, 109, 395/112, 114, 101; 358/512, 515, 501, 527, 538, 540, 296; 345/431; 347/151, 158

[56] References Cited

U.S. PATENT DOCUMENTS

| | | | |
|---|---|---|---|
| 5,515,479 | 5/1996 | Klassen | 395/109 |
| 5,563,985 | 10/1996 | Klassen et al. | 395/109 |
| 5,635,967 | 6/1997 | Klassen | 347/43 |
| 5,636,032 | 6/1997 | Springett | 358/296 |
| 5,649,071 | 7/1997 | Klassen et al. | 395/109 |

*Primary Examiner*—Kim Yen Vu
*Assistant Examiner*—Kimberly A. Williams
*Attorney, Agent, or Firm*—Blakely Sokoloff Taylor & Zafman

[57] ABSTRACT

A method for determining ink coverage requirements for all unique printing ink colors specified within a digital image. The steps of the method include selecting a plate from a plurality of plates to be included in the subject image vector graphics. Each plate includes a Name color that identifies a printing ink color as selected from an industry standard color system. The selected plate and the associated Named color are embedded in the image vector data. The vector data is then rasterized into bitmapped pixel data while preserving the embedded name colors. A set of bitmapped pixel data for each plate is produced. A pixel count of each set of pixel data is then performed to determine an ink coverage requirement for each plate and its associated Named color.

12 Claims, 3 Drawing Sheets

METHOD FOR DETERMINING INK REQUIREMENTS

FIELD OF THE INVENTION

The present invention relates to data processing by computer systems, and, in particular, determining the ink coverage requirements for digital artwork.

BACKGROUND OF THE INVENTION

Accurately predicting ink requirements for digital images has been recognized as a time-consuming and tedious process. Typically each digital image may include multiple specified ink colors, which may overlap to form the illusion/perception of other colors. During the prepress process each specified ink color of the digital image is separated into a film negative (or film positive) commonly referred to as a plate. Each plate of a multi-colored image is then printed sequentially in order to form a composite reproduction of the original digital image.

Accurately estimating the ink coverage requirement for each plate is very important. Ink shortages cause production delays, while excessive ink ordering creates cost overruns, storage problems and disposal cost.

There are at least two common methods of determining ink coverage requirements. One method involves simply making an educated guess through visual inspection of a full color composite image. This method, as expected, is likely to be inaccurate. Areas common to two or more plates in an image may overlap. The overlapping makes it is especially difficult to accurately determine the ink coverage for each individual plate because the overlapping may appear as one or more color(s) whose components may not be easily identified.

Another method may be used with reflective artwork. This method involves separating the image into component color plates using photography with different color lens filters, each lens corresponding in color and light transmission to one of the plates. With each of the lens filters, a separate photograph of the artwork is taken. Each photographic film negative then represents a specific component color plate isolated from the other plates. The isolated plate(s) can be used to more accurately estimate ink coverage. The photography method, however, is tedious, costly and still prone to the inaccuracy of guesswork.

A film scanning technique is also available for determining ink coverage requirements. Negative film for each component color must be generated through either photographic separation, digital scanning separation (from color transparency, color film negative or reflective art,) or software separation (from the original software authoring application.)

Film negatives for each component color are scanned one at a time on a specialized transmissive scanner, that precisely measures the ink coverage area. This method, while quite accurate still requires the expenditure of time and materials to produce film.

Additional prior art includes a pixel counting method. Pixels are the base units that form an image. A pixel is an area defined by its size (pixels per inch or centimeter, sometimes referred to as dots per inch or dpi also known as resolution,) its overall bit-depth (referring to possible color range,) and its RGB value (an intensity level for each of the primary colors: Red, Green and Blue.)

Each pixel is represented by a set of bits, the value of which determines the color of the pixel. The more number of bits used to represent each pixel, the more gray scale levels of color which may be represented by a pixel. For example, if a pixel is represented by eight bits per each primary color (Red, Green and Blue,) then the pixel may represent 256 levels of intensity for each color for a total of 16 million possible colors (256×256×256=16,777,216.)

The prior art pixel counting method tallies the number of pixels for each unique color value present in an RGB digital image (including any colors which may have been generated by two or more overlapping ink colors.) The prior art method is not able to separate the colors of an image into component ink color plates because it was developed for the more scientific task of quantifying all the unique colors of an image within the entire visible spectrum.

For example, the prior art method may be used to analyze digitized X rays, which might show a set of colors scaled to represent and quantify specific tissue densities. It may also be used to analyze an image of a flame, which might show colors corresponding to a range of temperatures, or a satellite image might display colors that index ground-microwave reflectivity or highlight infrared values for specific vegetation.

The inability of the prior art to separate the colors of an RGB image into an accurate representation of printing ink color plates prevents the prior art from accurately determining the area of each separate color plate in order to determine the ink coverage requirements for specified ink color.

In addition, the prior art method of counting pixels can only be performed on images that are presented as RGB pixel data (bitmapped.) The prior art method can not perform a pixel count on an image presented as vector graphics.

This limitation has significant draw backs. For example, the color of plates developed in vector graphics are typically selected from an industry standard color system, such as PANTONE, TRUEMATCH, FOCOLTONE, TOYO or CMYK (Cyan, Magenta, Yellow and Black), among others (including custom colors.) These standardized printing ink colors selected from industry color systems (or palette) are commonly referred to as Named Colors (or Spot Colors), wherein each unique color of a particular color system is identified by a unique name (i.e., an industry-wide recognized standard name). Ink requirements must be determined for each unique Named Color in an image.

The prior art method, however, has no intelligence or ability to identify Named Colors when generating a pixel count for the colors of an image. As a result, a person using the method of the prior art must inspect the pixel count data and manually enter the specified Named Colors in the data table of pixel counts.

Therefore, it can be appreciated that there exists a need for a method of determining the ink coverage requirements for each unique ink color specified within an image while preserving industry standard color names for each plate in the resulting data.

SUMMARY OF THE INVENTION

The present invention provides a method for determining ink coverage requirements for all unique printing ink colors specified within a digital image without producing film. The steps of the method include selecting a plate from a plurality of plates to be included in the subject image vector graphics. Each plate includes a Name Color that identifies a printing ink color as selected from an industry standard color system. The selected plate and the associated Named Color are embedded in the image vector data. The vector data is then rasterized into bitmapped pixel data while preserving the embedded Name Colors. A set of bitmapped pixel data for each plate is produced. A pixel count of each set of pixel data is then performed to determine an ink coverage requirement for each plate and its associated Named Color.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method of determining the ink coverage requirements for the plates of an image while preserving industry standard and custom Named Colors for each plate.

Figure 1:
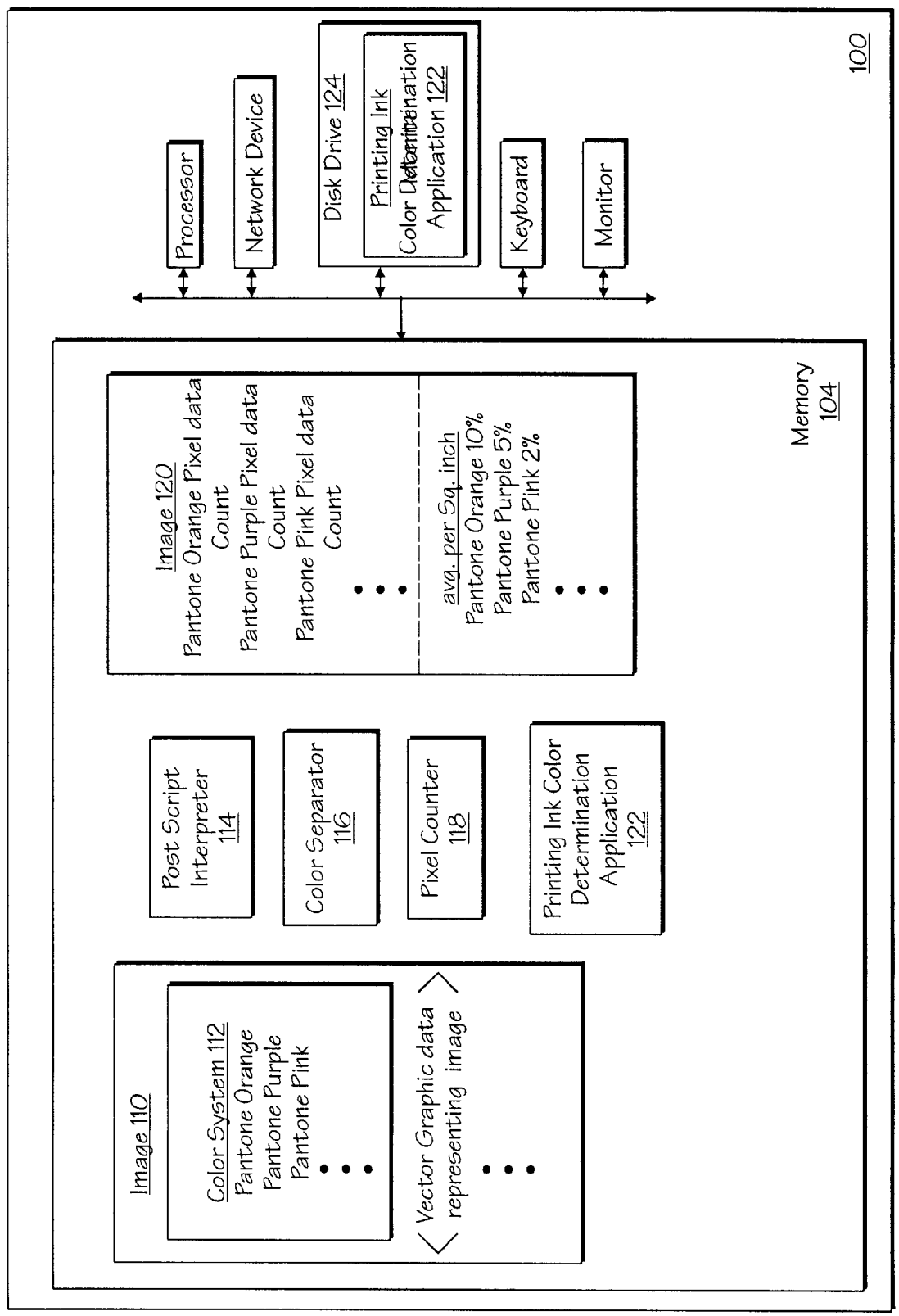
FIG. 1 illustrates a computer system capable of implementing a method for determining ink requirements according to one embodiment of the present invention.

Referring to FIG. 1, the computer system upon which one embodiment of the present invention can be implemented is shown as 100. Computer system 100 includes a memory 104 storing an image in a data file 110. The image as stored in the data file 110 is represented in vector graphics. The data file also includes a Color System header 112 that identifies Named Colors of each plate in the image, wherein the Named Colors are selected from an Industry Standard Color System.

The invention consists of a set of instructions typically stored in memory, as shown in FIG. 1 identified as the Printing Ink color Determination Application 122, which determines the printing ink coverage requirements for each of the plates prior to printing the plates.

The invention transfers a copy of the data file 110 to a color separation application 116, also shown stored in memory 104, in order to have the plates of the image sequentially separated. After each plate has been filtered from the image, it is then rasterized by a configurable PostScript interpreter 114 into pixel data.

The inventive application 122 then has the pixels of the pixel data counted by the pixel counter application 118, also shown stored in memory 104. The inventive application stores the results of each pixel count in an area of memory 120 allocated for storing pixel count of the image's plates.

The pixel counts of each plate are stored in the memory area 120 are identified as the respective Named Color convention of the plate. The pixel counts may each be analyzed by the present invention to determine the average pixel count for each plate per square inch of the image in order to determine the ink requirements for each plate of the image.

Figure 2A:
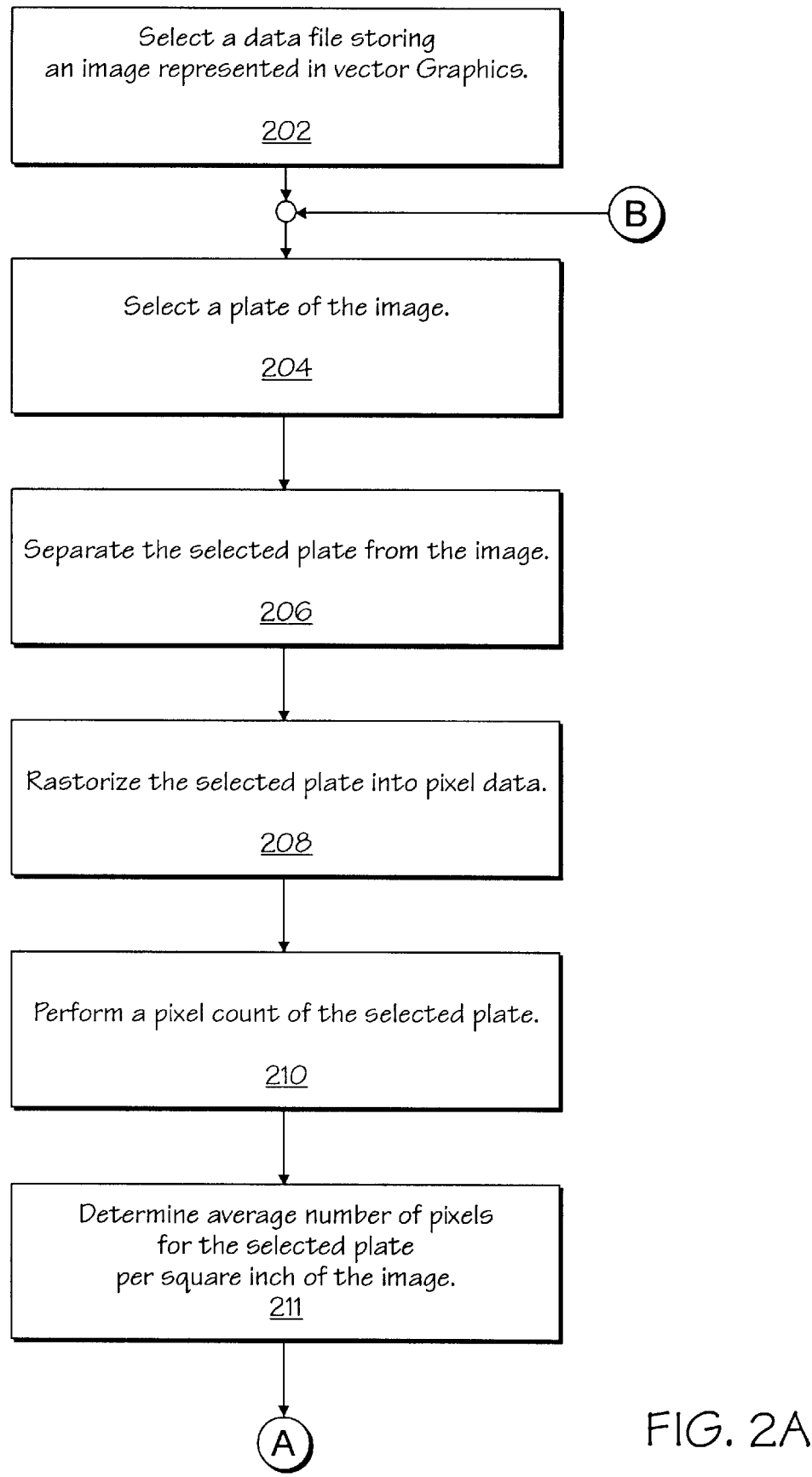
FIG. 2 is a flow diagram describing the steps of a method for determining ink requirements according to one embodiment of the present invention.
Figure 2B:
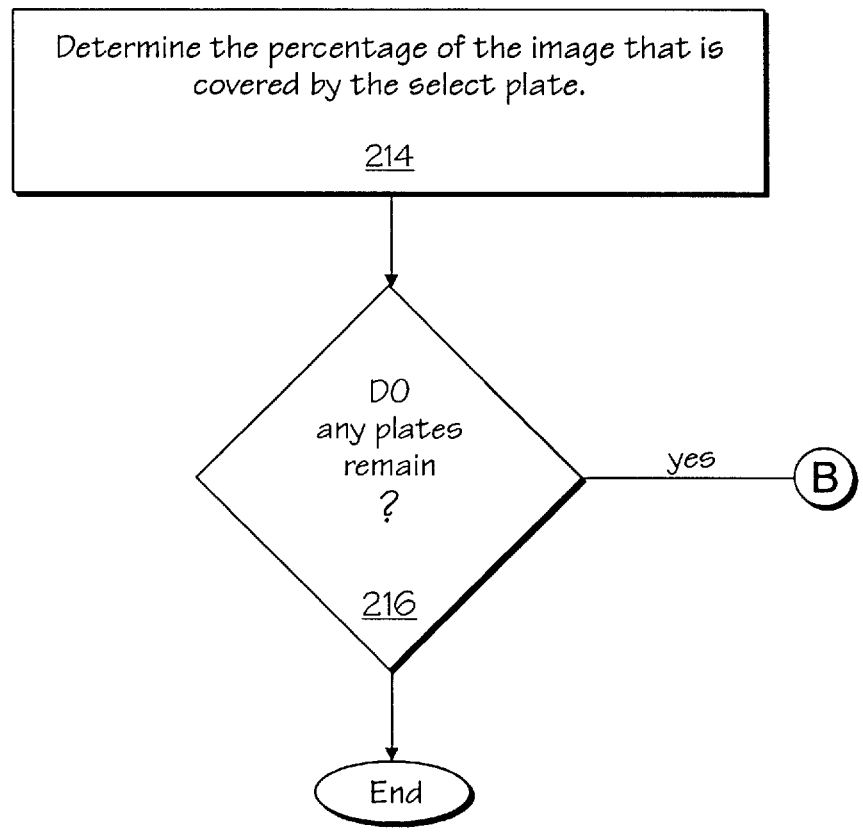

The steps of determining the ink requirements according to one embodiment of the invention are described in FIG. 2. In block 202, the image stored in the data file 110 is selected by a computer operator in order to determine the ink requirements for the plates of the image. The image in data file 110 is represented in vector graphics, which includes a collection of lines rather than a collection of dots. The lines are described with mathematical descriptions to determine the position, length, and direction in which the lines are to be drawn.

The image is typically encoded in a page description language (PDL), such as PostScript. The PDL describes output to a printer or a display device, which then uses the instructions from the PDL to construct the graphics necessary to create the image.

The data file 110 further includes a color system header 112, which identifies the plates of the image. Each of the plates is identified by a Named Color selected from an industry standard color system, such as PANTONE, TRUEMATCH, FOCOLTONE, TOYO or CMYK (Cyan, Magenta, Yellow and Black), among others (including custom colors.)

In an alternative embodiment, the invention is able process RGB raster data, such as reflective or transmissive art images scanned on a flatbed or drum scanner.

In block 204, the present invention selects a plate from the color system header. The plates are sequentially selected from the header.

In block 206, the present invention transfers a copy of the data file to a color separation application 116 in order to separate the selected plate of the image from the data file by filtering out the unselected plates. The selected plate may be filtered from the image 110 by going through the data file and copying, into a separate data file, each occurrence of the selected plate. Alternatively, all occurrences of the unselected plates may be deleted from the data file. In one embodiment, the color separation process is performed by an Adobe Color Separator typically stored in the memory, as shown in FIG. 1.

In block 208, the data representing the filtered plate is rasterized. During the rasterizing process, the selected plate, which was originally represented as vector graphics, is converted to its equivalent in pixel data.

In one embodiment, the rasterizing process is performed by a configurable PostScript interpreter 114 typically stored memory, as shown in the memory of FIG. 1. The interpreter sequentially processes each line of the data representing the filtered plate. In alternative embodiments, the rasterizing process could be performed by a conventional raster image processor (RIP), which includes a device consisting of a processor and related software dedicated to converting vector graphics and/or text into a bit-mapped image.

In block 210, the present invention counts the number of pixels for the filtered plate that are included in the image. The pixels are counted by a pixel counting application 118 typically stored in memory, as show in FIG. 1. In one embodiment, the interpreter generates streams of data that represent the filtered plate in pixel data. The pixels representing the filtered plate may be represented by a value identifying the filtered plate. The unselected plates may be represented by a null value.

The pixel count of each plate is typically stored in the area of memory 120 allocated for storing data regarding the pixel count of the image's plates. The pixel count for each of the plates may be stored and identified by the Named Color corresponding to the respective plate. As a result, further analysis of the pixel counts performed by the invention can be provided to an operator according to Industry Standard Color Systems, thereby providing the advantage to the operator of not having to manually identify specific Named Colors in the pixel count results.

In block 212, in one embodiment, the invention determines the average number of pixels for the filtered plate per square inch of the image. The present invention accumulates the total number of the pixels counted for the filtered plate and divides the total by the number of square inches in the image. The results are typically stored in an area of memory 120 allocated for storing data regarding the pixel count of the image's plates.

In block 214, the present invention determines the percentage of the image that is colored with the selected plate. The present invention divides the total number of pixels for the selected plate by the total number of pixels representing the image. These results are also typically stored in the area of memory 120 allocated for storing data regarding the pixel count of the image's plates.

By generating the average number of pixels per plate per square inch of a particular plate, and the percentage of the image that is covered by each plate, accurate printing ink requirements for each of the image's plate can be determined. This information can be scaled along with the image to maintain an accurate determination of the printing ink requirements for each of the image's plates.

In decision block 216, the present invention determines if any image plates remain to be rasterized and undergo a pixel count. If any plates remain, the method of the present invention loops back to block 204 and continues to process the next plate of the image in steps similar to 204–216. Otherwise, the method of the present invention is complete.

In the foregoing specification the invention has been described with reference to specific exemplary embodiments thereof. It will, however, be evident that various modifications and changes may be made thereto without departing from the broader spirit and scope of the invention. For instance, where it has been shown that the Printing Ink Color Determination Application 122, the data file 110 including the image represented in vector graphics, the interpreter 114, the color separator application 116, the pixel counting application 118, and the data representing pixel count of the images plates 120, are all stored in memory, these items and instructions can also be stored on other random access memory devices, and on other computer-readable mediums, including magnetic and optical disk, accessible via the disk drive shown in Computer System 100.

The specification and drawings are, accordingly, to be regarded in an illustrative rather than restrictive sense. Moreover, the following claims indicate the scope of the invention, and all variations which come within the meaning and range of equivalency of the claims are to be embraced within their scope.

What is claimed is:

1. A computer-implemented method for determining ink coverage requirements of separate printing ink colors in an image prior to printing the image, the method comprising the steps of:

selecting a first color from a plurality of colors included in the image, wherein the image is represented in vector graphics;

filtering the first color from the plurality of colors included in the image;

rasterizing the first color into a first set of pixel data representing the first color;

counting the first set of pixel data to determine an ink requirement for the first color; and preserving a Named Color for each color of said plurality of colors during the step of rasterizing and the step of counting the respective set of pixel data, wherein results of said counting are identified as said Named Color corresponding to the respective color selected from the plurality of colors.

2. The computer-implemented method of claim 1, wherein each Named Color of said plurality of colors in the image represented by vector graphics includes a custom Named Color selected from an Industry Standard Color System.

3. The computer-implemented method of claim 2, further comprising the step of:

generating an average pixel count for the first set of pixel data in a square N of the image.

4. The computer-implemented method of claim 3, further comprising the step of:

determining a percentage of the image that includes the first set of pixel data.

5. The computer-implemented method of claim 4, further comprising the step of:

repeating the steps of claim 1 for each color in said plurality of colors of said image.

6. The computer-implemented method of claim 4, wherein N is an inch.

7. A computer-readable medium having stored thereon a plurality of sequences of instructions, said plurality of sequences of instructions including a first sequence of instructions for determining ink coverage requirements of separate printing ink colors in an image prior to printing the image, the first sequence of instructions which, which, when executed by a processor, causes said processor to perform the steps of:

selecting a first color from a plurality of colors included in the image, wherein the image is represented in vector graphics;

filtering the first color from the plurality of colors included in the image;

rasterizing the first color into a first set of pixel data representing the first color;

counting the first set of pixel data to determine an ink coverage requirement for the first color; and preserving a Named Color for each color of said plurality of colors during the step of rasterizing and the step of counting the respective set of pixel data, wherein results of said counting are identified as said Named Color corresponding to the respective color selected from the plurality of colors.

8. The computer-readable medium of claim 7, wherein each Named Color of said plurality of colors in the image represented by vector graphics includes a Named Color selected from an Industry Standard Color System.

9. The computer-readable medium of claim 8, further storing a sequence of instructions, which when executed by said processor, causes said processor to perform the step of:

generating an average pixel count for the first set of pixel data in a square N of the image.

10. The computer-readable medium of claim 9, further storing a sequence of instructions, which when executed by said processor, causes said processor to perform the step of:

determining a percentage of the image that includes the first set of pixel data.

11. The computer-readable medium of claim 10, wherein N is an inch.

12. The computer-readable medium of claim 11, further storing a sequence of instructions, which when executed by said processor, causes said processor to perform the step of:

repeating the steps of claim 8 for each color in said plurality of colors of said image.

* * * * *